(12) United States Patent
Sela (10) Patent No.: US 6,343,170 B1
(45) Date of Patent: Jan. 29, 2002

(54) OPTICAL SPECTRUM ANALYZER

(75) Inventor: Ilan Sela, Haifa (IL)

(73) Assignee: Optichrom Inc., Dover, DE (US)

(*) Notice: Subject to any disclaimer, the term of this patent is extended or adjusted under 35 U.S.C. 154(b) by 0 days.

(21) Appl. No.: 09/780,466

(22) Filed: Feb. 12, 2001

Related U.S. Application Data (60) Provisional application No. 60/214,551, filed on Jun. 27, 2000.

(51) Int. Cl.[7] .................................................. G02B 6/34
(52) U.S. Cl. ........................................... 385/37; 385/47
(58) Field of Search ................................ 385/37, 43, 47

(56) References Cited

U.S. PATENT DOCUMENTS 5,970,190 A * 10/1999 Fu et al
6,108,471 A   8/2000 Zhang et al. .................. 385/37
6,263,134 B1 * 7/2001 Laude

OTHER PUBLICATIONS

Zhou,, Chen, Hunter & Dempewolf: Axial –Graded–Index (AGRIN) Lens –Based Eight Channel Wavelength Division Demultiplexer for Multimode Fiber–Optic Systems, 1998, *IEEE Photonics Technology Letters*, vol 10 No. 4, pp. 564–566.

Behzad Moslehi et al: Fiber–Optic wavelength–division multiplexing and demultiplexing using vol. holographic gratings Optic Letters, vol. 14, No. 19 pp. 1088–1090, 1989.

* cited by examiner

*Primary Examiner*—Hung N. Ngo
(74) *Attorney, Agent, or Firm*—Mark M. Griedman (57) ABSTRACT

An optical spectrum analyzer and methods for its use for multiplexing and demultiplexing. The optical spectrum analyzer includes two reflectors in a fixed spatial relationship to a volume phase grating. Input light is reflected by the first reflector to the volume phase grating, diffracted by the volume phase grating towards the second reflector along a first optical path, reflected back to the volume phase grating by the second reflector along a second optical path distinct from the first optical path, diffracted again by the volume phase grating towards the first reflector, and reflected out of the optical spectrum analyzer by the first reflector. Preferably, the reflectors are surfaces of transparent blocks that are optically coupled to the volume phase grating. The reflectors are arranged so that light of a plurality of equally spaced wavelengths, that is input to the optical spectrum analyzer at a single entry point, is demultiplexed to a corresponding plurality of equally spaced exit points. Conversely, individual equally spaced wavelengths, that are input at respective equally spaced entry points, are multiplexed to exit at a common exit point.

40 Claims, 7 Drawing Sheets

OPTICAL SPECTRUM ANALYZER

This application claims benefit of Provisional Application No. 60/214,551 filed Jun. 27, 2000.

FIELD AND BACKGROUND OF THE INVENTION

The present invention relates to optical spectrum analyzers, such as are used in optical multiplexers and demultiplexers, and, more particularly, to a monolithic optical spectrum analyzer based on a volume phase grating.

Fiber-optic systems are presently being developed for high-bandwidth, high-speed voice, video, and data communications. Originally, single-channel systems in which each fiber carried a single channel sufficed, but increasing traffic has led to a need for greater bandwidth. Because of the high cost of laying optical fibers, achieving greater efficiency in utilizing existing fiber resources has become increasingly important. This trend has led to the development of systems which provide two-way multiple channel communications over a single fiber.

In fiber optic systems, a convenient way to carry multiple channels over a single fiber without interference between the channels, for both one-way and bi-directional communications, is by means of a technique known as wavelength division multiplexing (WDM). According to this technique, multiple signals of separate wavelengths are coupled to the fiber at the transmitting side and separated at the receiving side. WDM is now a well-established technology to increase the information capacity of fiberoptic links, with 4, 8, and 16 channel systems already installed. These systems typically use cascaded discrete components such as interference filters or fiber gratings to separate channels with spacing of 200 to 400 GHz. The next generation of WDM systems expected to be deployed in the near future is Dense Wavelength Division Multiplexing and will support up to 60 or more 100 GHz channels or up to 120 or more 50 GHz channels. For such high channel counts, a parallel architecture is required for multiplexing/demultiplexing units because cascading a large number of systems can lead to problems including cumulative crosstalk, center wavelength inaccuracy, polarization dependent wavelength shift, and temperature instability.

Currently, there are two approaches that are capable of meeting these requirements: phased array waveguides, and diffraction gratings. The former is a monolithic approach that has been reported extensively in the literature but has significant problems for very large channel counts and requires temperature control. The latter approach with diffraction gratings has also been reported extensively in the literature. Most of the reported techniques utilize surface-relief diffraction gratings. In recent years, a new type of grating has been developed using holographic techniques, called the volume phase (VP) grating. Rather than being diffracted by surface-relief structures as in a surface grating (typically generated either by diamond ruling or by a holographic exposure of a photoresist layer), in a VP grating the light undergoes Bragg diffraction as it passes through the volume of a thin layer of material, in which the refractive index is modulated (for example, hardened dichromated gelatin). These volume-phase holographic gratings show improved performance over classical, low-order surface-relief gratings with respect to the following performance characteristics:

1. The blaze or efficiency envelope is governed by Bragg diffraction and can be tuned by adjustment of the grating angle for different wavelengths or diffraction orders.

2. VP gratings can have high diffraction efficiencies, approaching 100% for high line density (600 to 6000 l/mm), high dispersion transmission gratings, with low dependence on polarization angle.

3. Complex structures including the grating itself and collimating and focusing optics can be produced, in a monolithic configuration, to minimize the required number and/or complexity of optical elements, simplifying optical design and alignment and enhancing device efficiency.

4. The grating can be sandwiched between two appropriate substrates, to provide an environmentally stable device which is robust and has long lifetime without degradation.

A few prior art systems, based on the VP grating, have been shown to be suitable for multiplexing and demultiplexing. See, for example, Behzad Moslehi et al., "Fiber-optic wavelength-division multiplexing and demultiplexing using volume holographic gratings", *Optics Letters* vol. 14 no. 19 pp. 1088–1090 (1989) and Charles C. Zhou et al., "Axial-graded-index (AGRIN) lens-based eight-channel wavelength division demultiplexer for multimode fiber-optic systems", IEEE *Photonics Technology Letters* vol. 10 no. 4 pp. 564–566 (1998).

The device reported by Zhou et al. utilizes multimode fibers of 50 micrometer core diameter, 500 GHz spacing, covers a wavelength range from 764 to 792 nm, and utilizes Gradient Index Lenses (GRIN) as the imaging optics. State-of-the-art GRIN imaging optics are available commercially only in relatively small diameters, typically 0.5 to 3 mm. In fact, only very small diameter GRIN lenses can be manufactured with high precision and repeatability, as far as their doping profile is concerned, which in turn determines the index of refraction profile. As a result, the required high resolution of 50–100 GHz can be achieved only in two ways, either by using large surface gratings or by using large diffraction angles or grazing angles. The latter configuration, based on large diffraction angles, decreases the grating efficiency due to losses in the cavity. On the other hand, the former method, based on large surface gratings, requires larger imaging optics, so that an area of at least 1 centimeter width of grating is illuminated without degradation of efficiency. Because GRIN lenses can not be manufactured practically with diameters greater than about 3 millimeters, GRIN lenses are not optimal for this application.

The device of Moslehi et al. uses a VP grating and operates in the wavelength range of 710 to 900 nm and in a Littrow configuration. This is done by tilting the grating planes at an angle almost parallel with the grating surface. When the device is used in a reflection configuration the grating efficiency can be quite high for low dispersion applications (larger than 15 nm separation); however, for high dispersion applications, such as those required for DWDM (wavelength spacing of 0.8 nm to 0.4 nm) the efficiency bandwidth is narrower than desired.

Zhang et al., in U.S. Pat. No. 6,108,471, teach a wavelength demultilplexer in which a lens collimates a multi-wavelength input beam from an input optical fiber onto a VP grating. The resulting diffracted beams are reflected back through the VP grating to be diffracted a second time, and then are focused by the lens onto their respective output fibers.

The device of Zhou et al. is monolithic. The devices of Moslehi et al. and Zhang et al. are made of discrete components, and so are not as mechanically stable as the device of Zhou et al.

Figure 1:
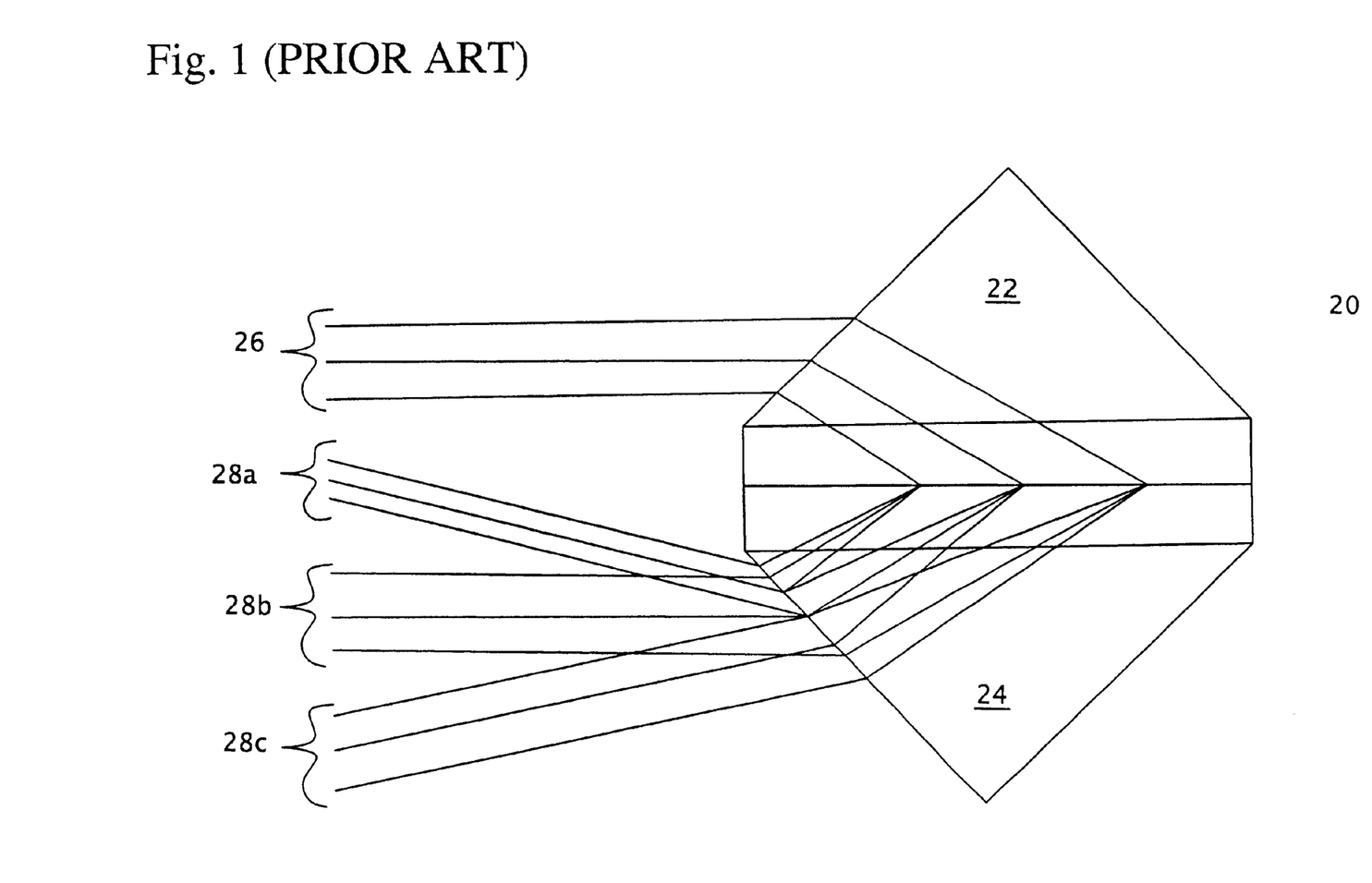
FIG. 1 shows a prior art monolithic device that is based on a volume phase grating.

Kaiser Optical Systems of Ann Arbor Mich. offers for sale the monolithic, VP-grating-based device illustrated in FIG.

1. This device consists of a VP grating 20 sandwiched between two prisms 22 and 24. Also shown in FIG. 1 is a collimated input beam 26 that includes three wavelengths that emerge from the device as three output beams 28a, 28b and 28c. The device of FIG. 1 diffracts input beam 26 at large diffraction angles, and so suffers from the same deficiencies as the Zhou et al. device discussed above.

There is thus a widely recognized need for, and it would be highly advantageous to have, a volume-phase-grating based multiplexer and demultiplexer that would overcome the disadvantages of presently known devices as described above.

SUMMARY OF THE INVENTION

According to the present invention there is provided an optical spectrum analyzer including: (a) at least one volume phase grating; (b) a first reflector; and (c) a second reflector; the first and second reflectors being in a fixed spatial relationship with the at least one volume phase grating, so that light entering the optical spectrum analyzer is reflected by the first reflector towards the at least one volume phase grating, the reflected light is diffracted towards the second reflector while traversing the at least one volume phase grating, and the once-diffracted light is reflected back by the second reflector towards the at least one volume phase grating and is again diffracted towards the first reflector while again traversing the at least one volume phase grating.

According to the present invention there is provided an optical spectrum analyzer, including: (a) at least one volume phase grating for diffracting input light; and (b) a first reflector for receiving the diffracted input light from the at least one volume phase grating along a first optical path and reflecting the diffracted input light back to the at least one volume phase grating along a second optical path distinct from the first optical path.

According to the present invention there is provided a method of demultiplexing input light of a plurality of free space wavelengths, including the steps of: (a) diffracting the input light towards a reflector, the input light of each wavelength being diffracted towards the reflector along a respective first optical path; (b) reflecting the diffracted light, using the reflector, the diffracted light of each wavelength being reflected along a respective second optical path distinct from the respective first optical path; and (c) diffracting the reflected light.

According to the present invention there is provided a method of multiplexing input light of a plurality of wavelengths, including the steps of: (a) directing the input light towards a diffraction mechanism; (b) diffracting the input light towards a first reflector, using the diffraction mechanism, the input light of each wavelength being diffracted towards the first reflector along a respective first optical path; (c) reflecting the diffracted light, using the first reflector, the diffracted light of each wavelength being reflected along a respective second optical path distinct from the respective first optical path; and (d) diffracting the reflected light; the directing of the input light being effected so that all the twice-diffracted light travels along a common optical path.

As understood herein, an optical channel is a beam of light, of a certain carrier wavelength, that is modulated to carry signals. Unless otherwise specified, the wavelength of an optical channel is understood herein to be the free space carrier wavelength of the optical channel.

As understood herein, an "optical path" is a region in space through which a beam of light propagates. The beam of light may be converging, diverging or collimated.

As understood herein, "multiplexing" is the operation of merging several optical channels, of different carrier wavelengths, that initially travel along separate respective optical paths, to travel along a common optical path. "Demultiplexing" is the inverse of multiplexing: the separation of several multiplexed optical channels to travel along separate respective optical paths. In optical communications, the optical paths typically are defined by waveguides such as optical fibers.

The device of the present invention is a modular optical spectrum analyzer. Like the prior art device of FIG. 1, the device of the present invention is based on a VP grating sandwiched between two transparent blocks. Unlike the prior art device of FIG. 1, the transparent blocks of the present invention are provided with reflective surfaces that enable the double diffraction of an input beam (for demultiplexing) or of several input beams (for multiplexing) at low diffraction angles. The diffraction angles of the present invention are preferably less than 23 degrees, and most preferably less than 16 degrees. The first block includes a portal surface through which light enters and exits the device, and a first, preferably curved, most preferably paraboloidal or spherical, reflective surface that collimates input light onto the VP grating. The second block includes a second reflective surface for reflecting the once-diffracted light back to the VP grating to be diffracted a second time. Although the second surface may be planar, preferably, the second reflective surface is a dihedron, so that the once-diffracted light travels to and from the second reflective surface along two distinct optical paths.

For multiplexing, one output optical fiber and several input optical fibers are optically coupled to the first block at the portal surface. For demultiplexing, one input optical fiber and several output optical fibers are optically coupled to the portal surface. The first reflector, in addition to directing input light towards the VP grating, also directs twice-diffracted light towards the portal surface.

The low diffraction angles of the present invention enable the location of the exit points, on the portal surface, of demultiplexed light, to be a linear function of the carrier wavelengths. The appropriate figure of merit for this linearity is the second derivative of exit point location with respect to carrier wavelength. Preferably, for demultiplexed light having wavelengths between about 1.4 microns and about 1.6 microns, this figure of merit is at most $6 \times 10^{-9}$ nanometers per square micron.

To demultiplex a set of optical channels, the optical channels are introduced to the device of the present invention via a single input optical fiber that is optically coupled to the portal surface. The input light is reflected and collimated by the first reflective surface towards the VP grating, diffracted a first time by the VP grating towards the second reflective surface, reflected by the second reflective surface back towards the VP grating, diffracted a second time by the VP grating towards the first reflective surface, and reflected by the first reflective surface towards a set of output optical fibers that are optically coupled to the portal surface, with each channel being diffracted towards its respective output optical fiber.

To multiplex a set of optical channels, the optical channels are introduced to the device of the present invention via respective input optical fibers that are optically coupled to the portal surface. The input light is reflected and collimated by the first reflective surface towards the VP grating, diffracted a first time by the VP grating towards the second reflective surface, reflected by the second reflective surface back towards the VP grating, diffracted a second time by the VP grating towards the first reflective surface, and reflected by the first reflective surface towards a single output optical fiber that is optically coupled to the portal surface.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a monolithic optical spectrum analyzer that is based on a volume phase grating. The present invention can be used to multiplex and demultiplex optical channels.

The principles and operation of an optical spectrum analyzer according to the present invention may be better understood with reference to the drawings and the accompanying description.

Figure 2A:
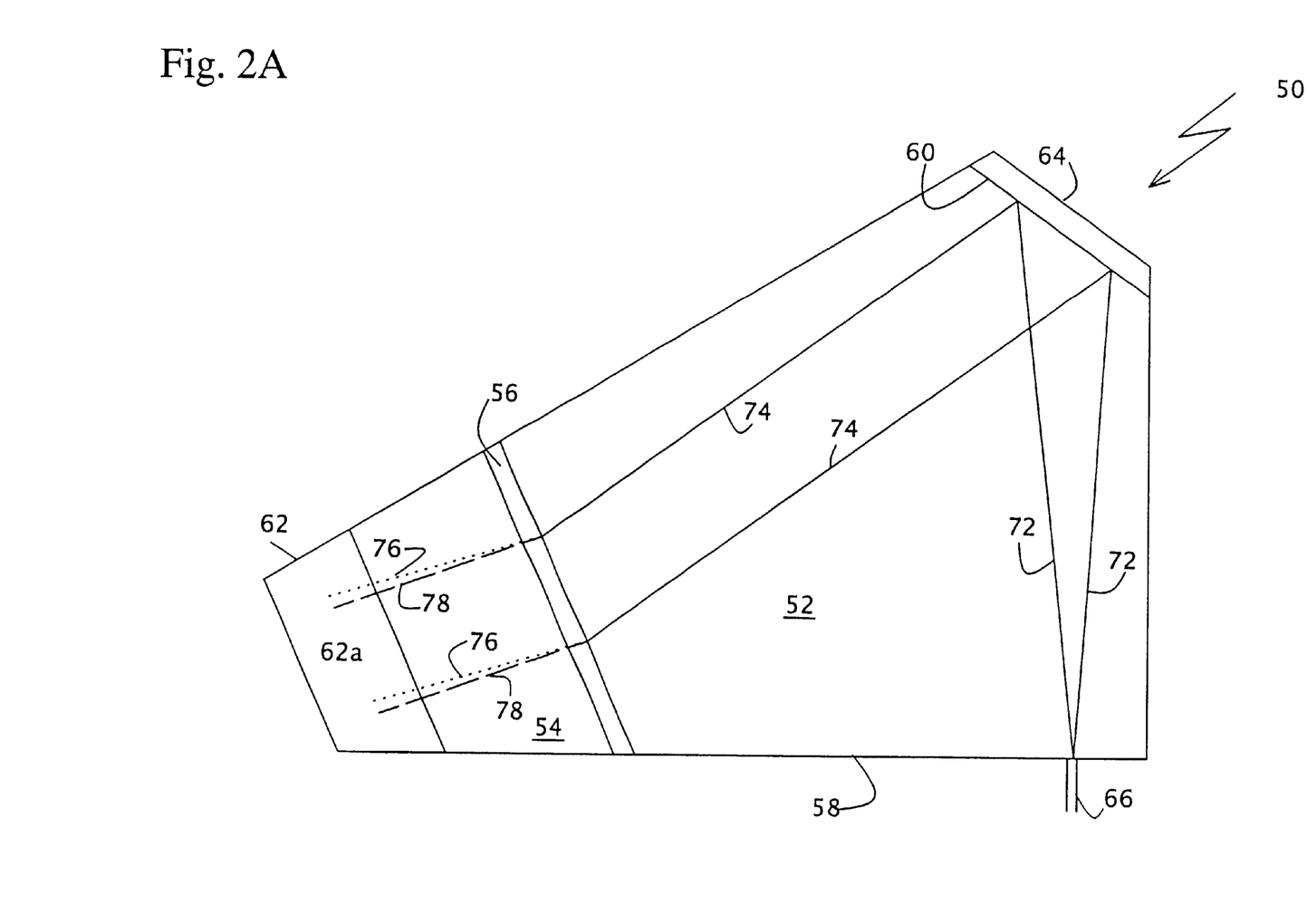
FIGS. 2A and 2B are side views of an optical spectrum analyzer of the present invention.
Figure 2B:
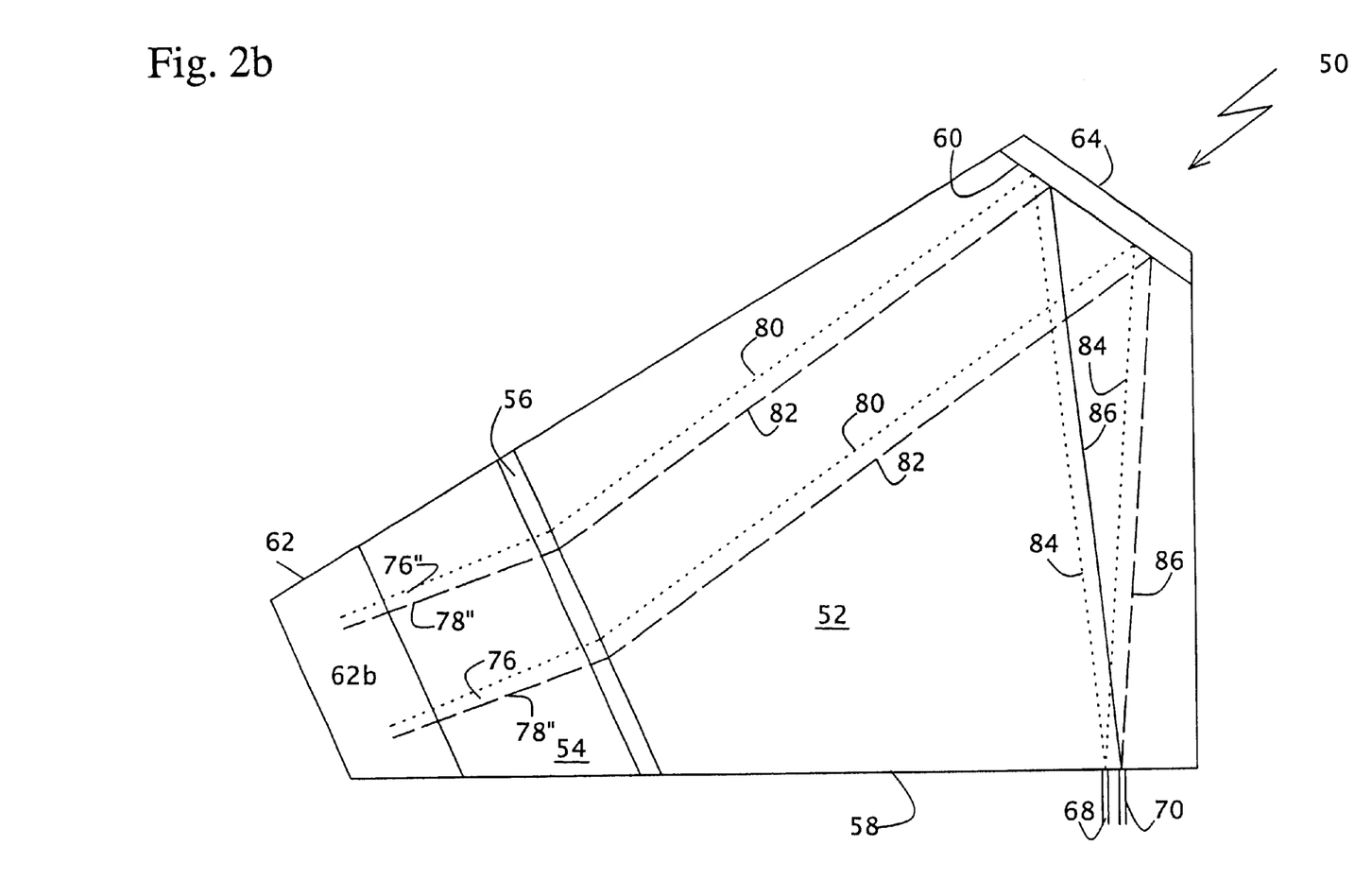
Figure 3:
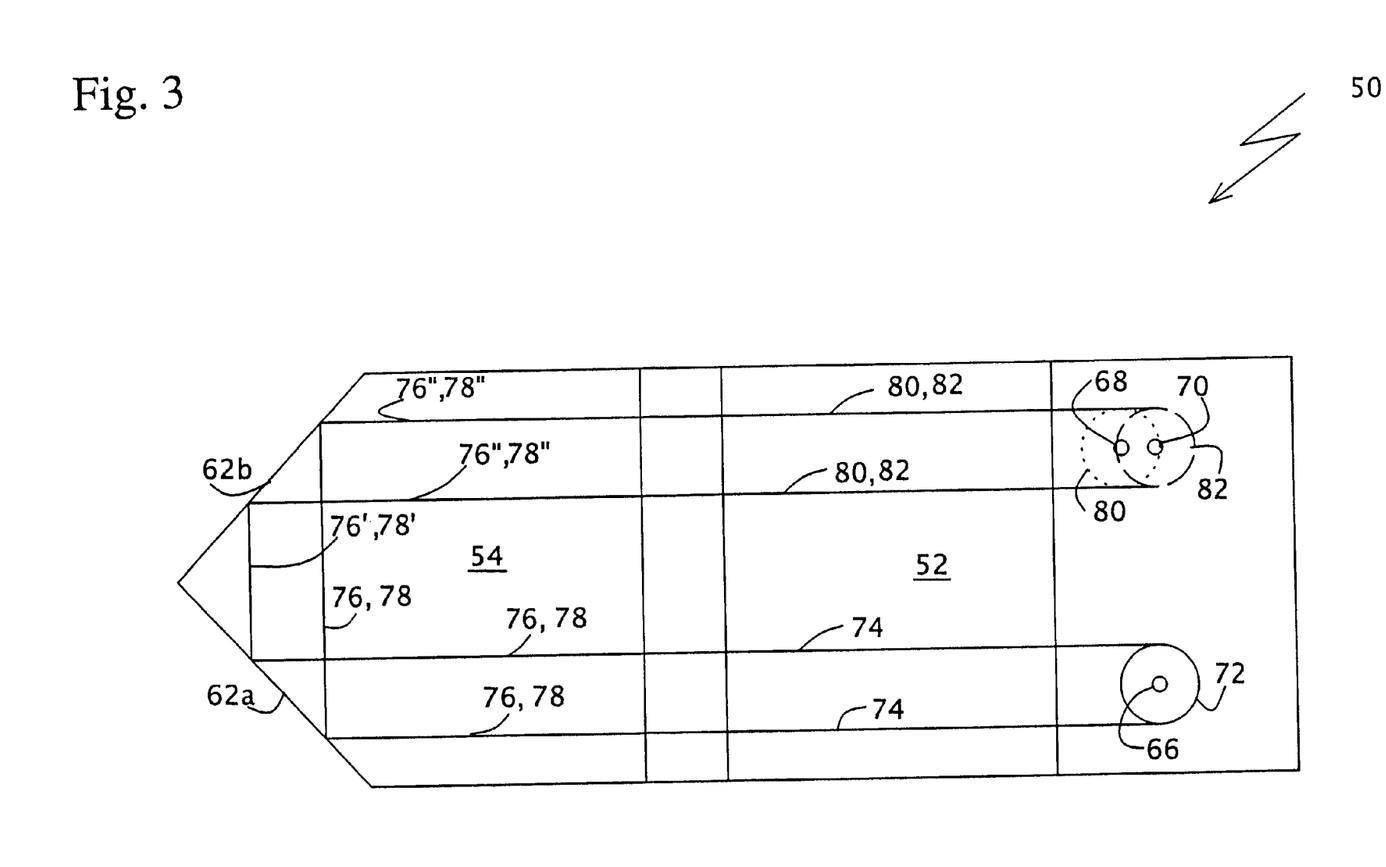
FIG. 3 is a top view of the optical spectrum analyzer of FIGS. 2A and 2B.

Referring again to the drawings, FIGS. 2A, 2B and 3 illustrate an optical spectrum analyzer 50 of the present invention. FIGS. 2A and 2B are side views. FIG. 3 is a top view. The device of the present invention now will be described in demultiplexing mode.

Optical spectrum analyzer 50 includes two transparent blocks 52 and 54, between which is sandwiched a VP grating 56. Blocks 52 and 54 are made of a low thermal expansion material having good optical and thermal properties, for example fused silica glass. Block 52 includes a flat portal surface 58 and a curved, preferably paraboloidal, reflective surface 60. Block 54 includes a reflective surface 62 in the form of a dihedron that includes two flat subsurfaces 62a and 62b. An input optical fiber 66 and two output optical fibers 68 and 70 are optically coupled to block 52 at portal surface 58, preferably by being glued to portal surface 58.

As best seen in FIG. 2A, the light of two optical channels, having two respective carrier wavelengths $\lambda_1$ and $\lambda_2$, is introduced to optical spectrum analyzer 50 via optical fiber 66. This input light emerges from optical fiber 66 along a divergent optical path defined by lines 72. The divergence angle of this optical path depends on the numerical aperture of optical fiber 66. The input light is reflected and collimated by curved reflective surface 60 towards VP grating 56 along a collimated optical path defined by lines 74. VP grating 56 diffracts the input light towards reflective surface 62. Because the two channels have two different carrier wavelengths, the two channels are diffracted towards reflective surface 62 at two different angles, along two different optical paths. The optical path along which the optical channel of carrier wavelength $\lambda_1$ is diffracted towards reflective surface 62 is defined by lines 76. The optical path along which the optical channel of carrier wavelength $\lambda_2$ is diffracted towards reflective surface 62 is defined by lines 78.

As best seen in FIG. 3, reflective subsurface 62a reflects the once-diffracted light incident thereon from VP grating 56 towards reflective subsurface 62b along optical paths defined by lines 76' and 78', and reflective subsurface 62b reflects the once-diffracted light back towards VP grating 56 along optical paths defined by lines 76" and 78". Note that the optical paths traveled by the once-diffracted light from reflective surface 62 back to VP grating 56 is totally distinct from the optical paths traveled initially by the once-diffracted light from VP grating 56 to reflective surface 62: the two sets of optical paths are separated spatially and do not overlap. One consequence of this is that the once-diffracted light is diffracted a second time in a portion of VP grating 56 that is separate and distinct from the portion of VP grating 56 in which the input light is diffracted.

As best seen in FIG. 2B, the twice-diffracted light emerging from VP grating 56 travels along optical paths defined by lines 80 and 82 back to curved reflective surface 60. Curved reflective surface 60 focuses the two channels of the twice-diffracted light onto respective output optical fibers: the channel whose carrier wavelength is $\lambda_1$ is focused by curved reflective surface 60 onto output optical fiber 68, via a convergent optical path defined by lines 84; and the channel whose carrier wavelength is $\lambda_2$ is focused by curved reflective surface 60 onto output optical fiber 70, via a convergent optical path defined by lines 86.

To ensure total reflection from curved surface 60, curved surface 60 is backed by a mirror 64. Mirror 64 is not shown in FIG. 3, for illustrational clarity.

Also for illustrational clarity, the above example shows the demultiplexing of two channels into two output optical fibers 68 and 70. Typically, 40, 80 or 90 output optical fibers are provided, for demultiplexing the same number of channels.

Preferably, transparent blocks 52 and 54 are secured to VP grating 56 by an index-matching glue. Preferably, the output optical fibers are assembled into a linear bundle that is glued as such to portal surface 58 by the index matching glue. The optical fibers and the dihedron are aligned with respect to each other by shifting the linear bundle along portal surface 58 and by shifting transparent block 54 laterally along its surface of contact with VP grating 56 before the index matching glue dries and hardens.

As noted above, multiplexing is the inverse operation of demultiplexing. In multiplexing mode, optical fibers 68 and 70 are used for input and optical fiber 66 is used for output. The optical channel having, carrier wavelength $\lambda_1$ is introduced to optical spectrum analyzer 50 via optical fiber 68. The optical channel having carrier wavelength $\lambda_2$ is introduced to optical spectrum analyzer 50 via optical fiber 70. The input light emerges from optical fibers 68 and 70 along divergent optical paths defined by lines 84 and 86, respectively. The input light is reflected and collimated by curved reflective surface 60 towards VP grating 56 along collimated optical paths defined by lines 80 and 82. VP grating 56 diffracts the input light towards reflective surface 62 via optical paths defined by lines 76" and 78". Reflective subsurface 62b reflects the once-diffracted light towards reflective subsurface 62a via optical paths defined by lines 76' and 78'. Reflective subsurface 62a reflects the once-diffracted light back towards VP grating 56 via optical paths defined by lines 76 and 78. The second diffraction at VP grating 56 merges the two channels into a common optical path defined by lines 74. The two channels are reflected and focused by reflective surface 60 onto output optical fiber 66 via a convergent optical path defined by lines 72.

As noted above, the assembly of an optical spectrum analyzer of the present invention is facilitated by grouping all of the output optical fibers (for a demultiplexer) or all of the input optical fibers (for a multiplexer) in a common linear bundle. The assembly of an optical spectrum analyzer of the present invention is further facilitated by spacing all of the optical fibers equally within the bundle; but for this equal spacing to be effective, the location of the carrier wavelengths along portal surface 58 must be a linear function of carrier wavelength. The appropriate figure of merit for measuring deviations from the desired linearity is the second derivative of carrier wavelength location with respect to carrier wavelength.

Figure 4A:
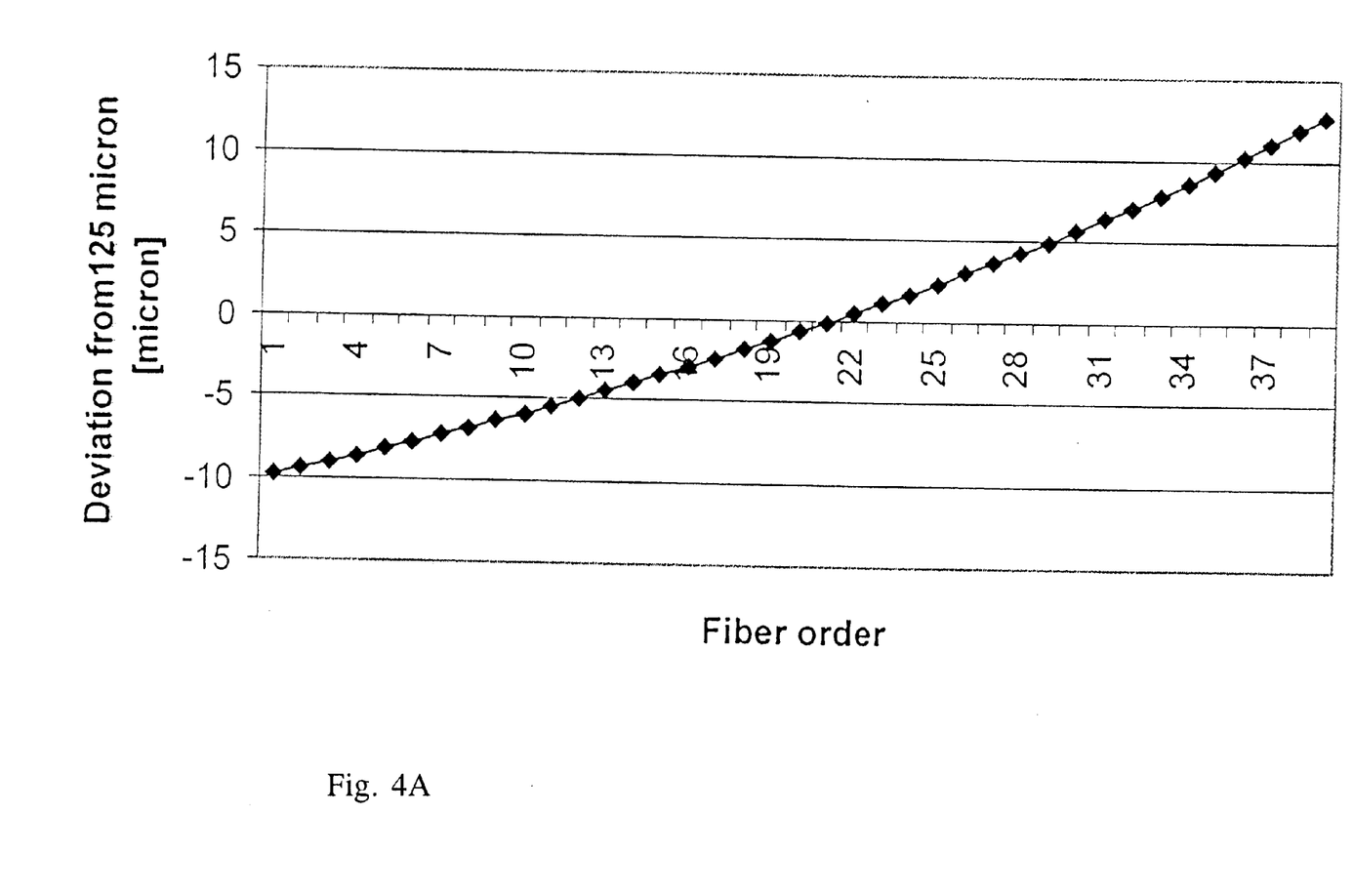
FIGS. 4A and 4B are plots of deviations of equally spaced carrier wavelengths from linear exit point spacing upon being demultiplexed by the device of FIG. 1 and by the optical spectrum analyzer of FIGS. 2–3, respectively.
Figure 4B:
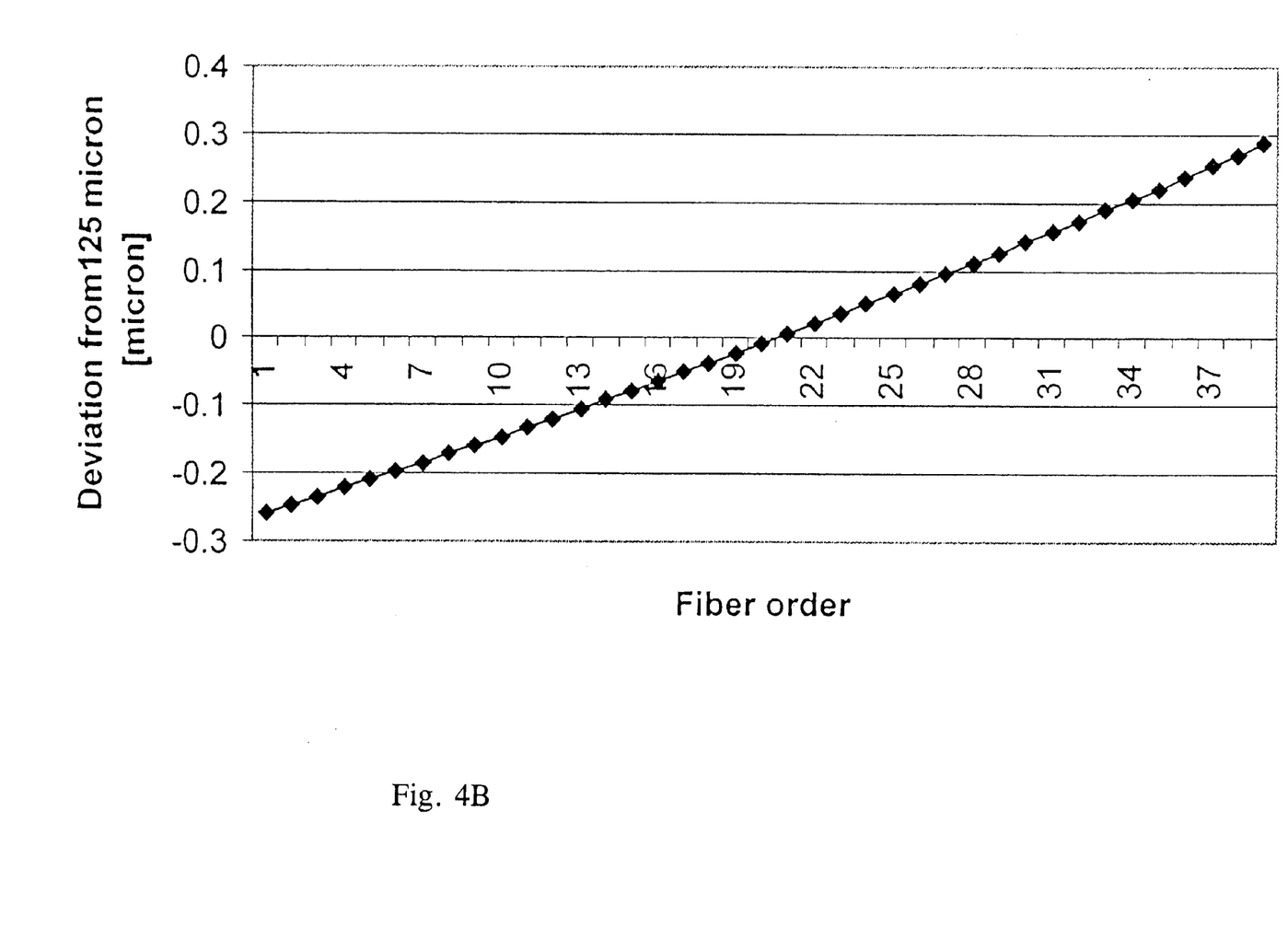

FIGS. 4A and 4B illustrate the superiority of the optical spectrum analyzer of the present invention over the prior art device of FIG. 1 in this regard, for the specific example of 40 adjacent optical fibers, each having a diameter of 125 microns, carrying 40 optical channels with free space carrier wavelengths of about 1500 nanometers spaced 0.8 nanometers (i.e., 100 GHz in frequency) apart. FIG. 4A shows the deviation of the carrier wavelengths from linear spacing after demultiplexing by the device of FIG. 1. If the optical fibers are single mode fibers with 9 micron core diameters (i.e., 4.5 micron core radii), then most of the demultiplexed channels miss the cores of their intended output optical fibers. The corresponding second derivative figure of merit is $-2.3 \times 10^{-7}$ nanometers per square micron. FIG. 4B shows the deviation of the carrier wavelengths from linear spacing after demultiplexing by an optical spectrum analyzer of the present invention. All of the demultiplexed channels arrive at their intended output optical fibers within 0.3 microns of the centers of the fiber cores. The corresponding second derivative figure of merit is $-5.6 \times 10^{-9}$ nanometers per square micron.

Figure 5:
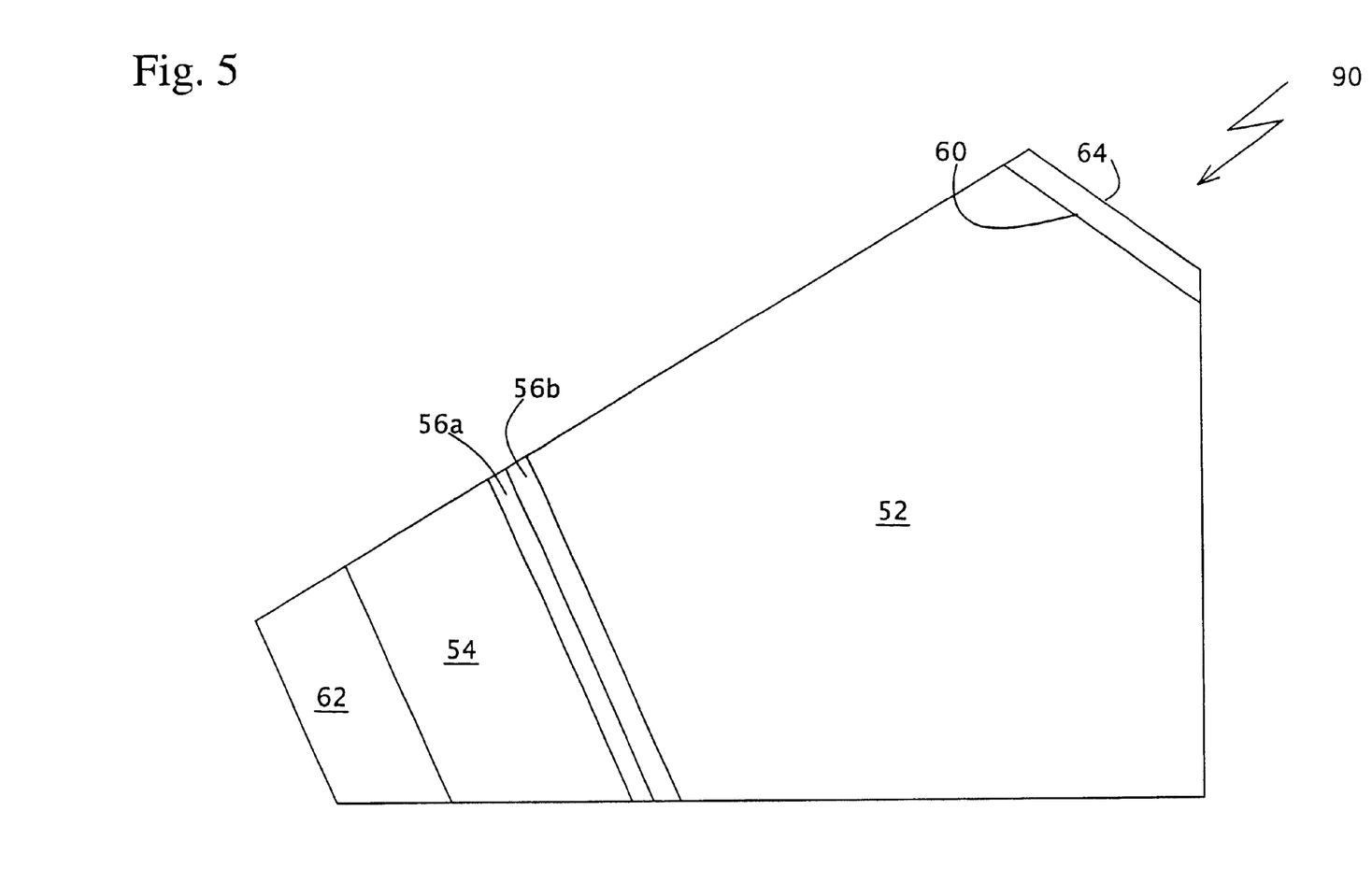
FIG. 5 shows a variant of the optical spectrum analyzer of FIGS. 2A, 2B and 3.

Most preferably, the optical spectrum analyzer of the present invention includes several volume phase gratings tilted slightly with respect to each other. This allows increased dispersion without a concomitant increase in the size of the device. FIG. 5 is a partial depiction of a variant 90 of optical spectrum analyzer 50. Instead of only one volume phase grating 56, optical spectrum analyzer 90 has two volume phase gratings 56a and 56b sandwiched between transparent blocks 52 and 54. With a paraboloidal reflective surface 60 of the same focal length as in optical spectrum analyzer 50, optical spectrum analyzer 90 can demultiplex 40 optical channels with free space carrier wavelengths of about 1500 nanometers spaced 0.4 nanometers (i.e., 50 GHz in frequency) apart, into 40 adjacent output optical fibers spaced 125 microns apart.

While the invention has been described with respect to a limited number of embodiments, it will be appreciated that many variations, modifications and other applications of the invention may be made.

What is claimed is:

1. An optical spectrum analyzer comprising:
   (a) at least one volume phase grating;
   (b) a first reflector;
   (c) a second reflector;
   (d) a first transparent block; and
   (e) a second transparent block;
   said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating; said at least one volume phase grating being optically coupled to said first and second blocks, said first reflector being a reflective surface of said first block, said second reflector being a reflective surface of said second block.

2. The optical spectrum analyzer of claim 1, wherein said at least one volume phase grating is sandwiched between said first and second blocks.

3. The optical spectrum analyzer of claim 1, wherein said first transparent block includes a portal surface wherethrough said light enters the optical spectrum analyzer.

4. The optical spectrum analyzer of claim 3, further comprising:
   (f) at least one input optical fiber, optically coupled to said first transparent block at said portal surface, for introducing said light into the optical spectrum analyzer.

5. The optical spectrum analyzer of claim 3, wherein said first reflector reflects said twice-diffracted light towards said portal surface.

6. The optical spectrum analyzer of claim 5, further comprising:
   (f) at least one output optical fiber, optically coupled to said first transparent block at said portal surface, for receiving at least a portion of said twice-diffracted light from said first reflector.

7. An optical spectrum analyzer, comprising:
   (a) at least one volume phase grating for diffracting input light; and
   (b) a first reflector for receiving said diffracted input light from said at least one volume phase grating along a first optical path and reflecting said diffracted input light back to said at least one volume phase grating along a second optical path distinct from said first optical path;
   wherein said first reflector is a dihedron.

8. A method of demultiplexing input light of a plurality of free space wavelengths, comprising the steps of:
   (a) diffracting the input light towards a reflector, the input light of each wavelength being diffracted towards said reflector along a respective first optical path;
   (b) reflecting said diffracted light, using said reflector, said diffracted light of each wavelength being reflected along a respective second optical path distinct from said respective first optical path; and
   (c) diffracting said reflected light;
   wherein both diffractings are effected using a common diffraction mechanism.

9. The method of claim 8, wherein said common diffraction mechanism includes at least one volume phase grating.

10. A method of multiplexing input light of a plurality of wavelengths, comprising the steps of:
    (a) directing the input light towards a diffraction mechanism;
    (b) diffracting the input light towards a first reflector, using said diffraction mechanism, the input light of each wavelength being diffracted towards said first reflector along a respective first optical path;
    (c) reflecting said diffracted light, using said first reflector, said diffracted light of each wavelength being reflected along a respective second optical path distinct from said respective first optical path; and (d) diffracting said reflected light;
said directing of the input light being effected so that all said twice-diffracted light travels along a common optical path, said directing of the input light being effected using a second reflector, and said directing of the input light including collimating the input light.

11. An optical spectrum analyzer comprising:
    (a) at least one volume phase grating;
    (b) a first reflector;
    (c) a second reflector; and
    (d) at least one output optical fiber for receiving at least a portion of said twice-diffracted light from said first reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating.

12. An optical spectrum analyzer comprising:
    (a) at least one volume phase grating;
    (b) a first reflector; and
    (c) a second reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating; and wherein said first reflector is curved, so that said light that enters the optical spectrum analyzer is collimated by said first reflector towards said at least one volume phase grating.

13. The optical spectrum analyzer of claim 12, wherein said first reflector is paraboloidal.

14. The optical spectrum analyzer of claim 12, wherein said first reflector is spherical.

15. An optical spectrum analyzer comprising:
    (a) at least one volume phase grating;
    (b) a first reflector; and
    (c) a second reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating; wherein said once-diffracted light propagates from said at least one volume phase grating towards said second reflector along a first optical path, and wherein said second reflector reflects said once-diffracted light back towards said at least one volume phase grating along a second optical path distinct from said first optical path.

16. The optical spectrum analyzer of claim 15, wherein said second reflective surface is a dihedron.

17. An optical spectrum analyzer comprising:
    (a) at least one volume phase grating;
    (b) a first reflector; and
    (c) a second reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating; and wherein said light is diffracted by said at least one volume phase grating at a diffraction angle of at most about 23 degrees.

18. The optical spectrum analyzer of claim 17, wherein said diffraction angle is at most about 16 degrees.

19. An optical spectrum analyzer comprising:
    (a) at least one volume phase grating;
    (b) a first reflector; and
    (c) a second reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating; and wherein said light having a free space wavelength of about 1.5 microns, and entering the optical spectrum analyzer at a single entry point on a portal surface, leaves the optical spectrum analyzer at an exit point on said portal surface whose location depends linearly on said wavelength to within about $66 \times 10^{-9}$ nanometers per square micron.

20. A demultiplexer comprising an optical spectrum analyzer that includes:
    (a) at least one volume phase grating;
    (b) a first reflector; and
    (c) a second reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating.

21. A multiplexer comprising an optical spectrum analyzer that includes:
    (a) at least one volume phase grating;
    (b) a first reflector; and
    (c) a second reflector;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating.

22. An optical spectrum analyzer, comprising:
   (a) at least one volume phase grating for diffracting input light;
   (b) a first reflector for receiving said diffracted input light from said at least one volume phase grating along a first optical path and reflecting said diffracted input light back to said at least one volume phase grating along a second optical path distinct from said first optical path; and
   (c) a first transparent block that is optically coupled to said at least one volume phase grating, said first reflector being a surface of said first transparent block.

23. An optical spectrum analyzer, comprising:
   (a) at least one volume phase grating for diffracting input light;
   (b) a first reflector for receiving said diffracted input light from said at least one volume phase grating along a first optical path and reflecting said diffracted input light back to said at least one volume phase grating along a second optical path distinct from said first optical path; and
   (c) at least one input optical fiber for introducing said light into the optical spectrum analyzer.

24. An optical spectrum analyzer, comprising:
   (a) at least one volume phase grating for diffracting input light; and
   (b) a first reflector for receiving said diffracted input light from said at least one volume phase grating along a first optical path and reflecting said diffracted input light back to said at least one volume phase grating along a second optical path distinct from said first optical path;
   wherein said reflected light is again diffracted by said at least one volume phase grating; and wherein the optical spectrum analyzer further comprises:
   (c) at least one output optical fiber for receiving at least a portion of said twice-diffracted light from said at least one volume phase grating.

25. An optical spectrum analyzer, comprising:
   (a) at least one volume phase grating for diffracting input light; and
   (b) a first reflector for receiving said diffracted input light from said at least one volume phase grating along a first optical path and reflecting said diffracted input light back to said at least one volume phase grating along a second optical path distinct from said first optical path;
   wherein said light is diffracted by said at least one volume phase grating at a diffraction angle of at most about 23 degrees.

26. The optical spectrum analyzer of claim 25, wherein said diffraction angle is at most about 16 degrees.

27. An optical spectrum analyzer, comprising:
   (a) at least one volume phase grating for diffracting input light; and
   (b) a first reflector for receiving said diffracted input light from said at least one volume phase grating along a first optical path and reflecting said diffracted input light back to said at least one volume phase grating along a second optical path distinct from said first optical path;
   wherein said light having a free space wavelength of about 1.5 microns, and entering the optical spectrum analyzer at a single entry point on a portal surface, leaves the optical spectrum analyzer at an exit point on said portal surface whose location depends linearly on said wavelength to within about $6\times10^{-9}$ nanometers per square micron.

28. A demultiplexer comprising an optical spectrum analyzer that includes:
   (a) at least one volume phase grating for diffracting input light; and
   (b) a first reflector for receiving said diffracted input light from said at least one volume phase grating along a first optical path and reflecting said diffracted input light back to said at least one volume phase grating along a second optical path distinct from said first optical path.

29. A multiplexer comprising an optical spectrum analyzer that includes:
   (a) at least one volume phase grating for diffracting input light; and
   (b) a first reflector for receiving said diffracted input light from said at least one volume phase grating along a first optical path and reflecting said diffracted input light back to said at least one volume phase grating along a second optical path distinct from said first optical path.

30. A method of demultiplexing input light of a plurality of free space wavelengths, comprising the steps of:
   (a) diffracting the input light towards a reflector, the input light of each wavelength being diffracted towards said reflector along a respective first optical path;
   (b) reflecting said diffracted light, using said reflector, said diffracted light of each wavelength being reflected along a respective second optical path distinct from said respective first optical path; and
   (c) diffracting said reflected light;
wherein said reflector includes a dihedron.

31. A method of demultiplexing input light of a plurality of free space wavelengths, comprising the steps of:
   (a) diffracting the input light towards a reflector, the input light of each wavelength being diffracted towards said reflector along a respective first optical path;
   (b) reflecting said diffracted light, using said reflector, said diffracted light of each wavelength being reflected along a respective second optical path distinct from said respective first optical path; and
   (c) diffracting said reflected light;
wherein said diffracting is effected at an angle of at most about 23 degrees.

32. The method of claim 31, wherein said diffracting is effected at an angle of at most about 16 degrees.

33. An optical spectrum analyzer comprising:
   (a) at least one volume phase grating;
   (b) a first reflector;
   (c) a second reflector; and
   (d) at least one input optical fiber for introducing said light into the optical spectrum analyzer;
said first and second reflectors being in a fixed spatial relationship with said at least one volume phase grating, so that light entering the optical spectrum analyzer is reflected by said first reflector towards said at least one volume phase grating, said reflected light is diffracted towards said second reflector while traversing said at least one volume phase grating, and said once-diffracted light is reflected back by said second reflector towards said at least one volume phase grating and is again diffracted towards said first reflector while again traversing said at least one volume phase grating.

34. A method of demultiplexing input light of a plurality of free space wavelengths, comprising the steps of:
   (a) diffracting the input light towards a reflector, the input light of each wavelength being diffracted towards said reflector along a respective first optical path;
   (b) reflecting said diffracted light, using said reflector, said diffracted light of each wavelength being reflected along a respective second optical path distinct from said respective first optical path; and
   (c) diffracting said reflected light;
wherein said diffracting of the input light is effected using a diffraction mechanism; and wherein the method further comprises the steps of:
   (d) directing the input light towards said diffraction mechanism along a common optical path that includes a single entry point on a portal surface; and
   (e) directing said twice-diffracted light towards said portal surface, said twice-diffracted light of each said wavelength being directed towards a respective exit point on said portal surface, such that if said wavelengths are between about 1.4 microns and about 1.6 microns, and are equally spaced, said exit points are equally spaced to within about $6\times10^{-9}$ nanometers per square micron.

35. A method of multiplexing input light of a plurality of wavelengths, comprising the steps of:
   (a) directing the input light towards a diffraction mechanism;
   (b) diffracting the input light towards a first reflector, using said diffraction mechanism, the input light of each wavelength being diffracted towards said first reflector along a respective first optical path;
   (c) reflecting said diffracted light, using said first reflector, said diffracted light of each wavelength being reflected along a respective second optical path distinct from said respective first optical path; and
   (d) diffracting said reflected light, using said diffraction mechanism;
said directing of the input light being effected so that all said twice-diffracted light travels along a common optical path.

36. A method of multiplexing input light of a plurality of wavelengths, comprising the steps of:
   (a) directing the input light towards a diffraction mechanism that includes at least one volume phase grating;
   (b) diffracting the input light towards a first reflector, using said diffraction mechanism, the input light of each wavelength being diffracted towards said first reflector along a respective first optical path;
   (c) reflecting said diffracted light, using said first reflector, said diffracted light of each wavelength being reflected along a respective second optical path distinct from said respective first optical path; and
   (d) diffracting said reflected light;
said directing of the input light being effected so that all said twice-diffracted light travels along a common optical path.

37. A method of multiplexing input light of a plurality of wavelengths, comprising the steps of:
   (a) directing the input light towards a diffraction mechanism;
   (b) diffracting the input light towards a first reflector, using said diffraction mechanism, the input light of each wavelength being diffracted towards said first reflector along a respective first optical path;
   (c) reflecting said diffracted light, using said first reflector, said diffracted light of each wavelength being reflected along a respective second optical path distinct from said respective first optical path; and
   (d) diffracting said reflected light;
said directing of the input light being effected so that all said twice-diffracted light travels along a common optical path, said first reflector including a dihedron.

38. A method of multiplexing input light of a plurality of wavelengths, comprising the steps of:
   (a) directing the input light towards a diffraction mechanism;
   (b) diffracting the input light towards a first reflector, using said diffraction mechanism, the input light of each wavelength being diffracted towards said first reflector along a respective first optical path;
   (c) reflecting said diffracted light, using said first reflector, said diffracted light of each wavelength being reflected along a respective second optical path distinct from said respective first optical path; and
   (d) diffracting said reflected light;
said directing of the input light being effected so that all said twice-diffracted light travels along a common optical path, and said diffracting being effected at an angle of at most about 23 degrees.

39. The method of claim 38, wherein said diffracting is effected at an angle of at most about 16 degrees.

40. A method of multiplexing input light of a plurality of wavelengths, comprising the steps of:
   (a) directing the input light towards a diffraction mechanism;
   (b) diffracting the input light towards a first reflector, using said diffraction mechanism, the input light of each wavelength being diffracted towards said first reflector along a respective first optical path;
   (c) reflecting said diffracted light, using said first reflector, said diffracted light of each wavelength being reflected along a respective second optical path distinct from said respective first optical path; and
   (d) diffracting said reflected light;
said directing of the input light being effected so that all said twice-diffracted light travels along a common optical path that includes a single exit point on a portal surface; and wherein said input light of each said wavelength is directed towards said diffraction mechanism along a respective third optical path that crosses said portal surface at a respective entry point,. such that if said wavelengths are between about 1.4 microns and about 1.6 microns, and are equally spaced, said exit points are equally spaced to within about $6\times10^{-9}$ nanometers per square micron.

* * * * *